United States Patent [19]

Anderson et al.

[11] Patent Number: 5,227,342
[45] Date of Patent: Jul. 13, 1993

[54] PROCESS OF MAKING POROUS CERAMIC MATERIALS WITH CONTROLLED POROSITY

[75] Inventors: Marc A. Anderson; Qunyin Ku, both of Madison, Wis.

[73] Assignee: Wisconsin Alumni Research Foundation, Madison, Wis.

[21] Appl. No.: 693,898

[22] Filed: May 1, 1991

[51] Int. Cl.⁵ .............................................. C04B 38/00
[52] U.S. Cl. ........................................ 501/12; 501/80; 501/103; 501/134; 210/500.21; 210/510.1; 252/315.01
[58] Field of Search ................. 501/12, 130, 134, 103, 501/80; 264/43, 45.9, 46.1; 210/500.21, 510.1; 252/315.01

[56] References Cited

U.S. PATENT DOCUMENTS

| | | | |
|---|---|---|---|
| 4,562,021 | 12/1985 | Alary et al. | 264/43 |
| 4,584,280 | 4/1986 | Nanao et al. | 501/80 |
| 4,801,399 | 1/1989 | Clark et al. | 252/315.01 |
| 4,892,712 | 1/1990 | Robertson et al. | . |
| 5,006,248 | 4/1991 | Anderson et al. | . |
| 5,030,351 | 7/1991 | Burggraaf et al. | 210/500.21 |
| 5,035,784 | 7/1991 | Anderson et al. | . |

Primary Examiner—Karl Group
Attorney, Agent, or Firm—Quarles & Brady

[57] ABSTRACT

A method of making metal oxide ceramic material is disclosed by which the porosity of the resulting material can be selectively controlled by manipulating the sol used to make the material. The method can be used to make a variety of metal oxide ceramic bodies, including membranes, but also pellets, plugs or other bodies. It has also been found that viscous sol materials can readily be shaped by extrusion into shapes typical of catalytic or adsorbent bodies used in industry, to facilitate the application of such materials for catalytic and adsorbent applications.

24 Claims, 1 Drawing Sheet

PROCESS OF MAKING POROUS CERAMIC MATERIALS WITH CONTROLLED POROSITY

FIELD OF THE INVENTION

The present invention relates to the general field of creating metal oxide ceramic materials and describes, in particular, a method or process for creating such materials which permits the control of the porosity in the resulting ceramic material so that catalytic or adsorbent materials having a pre-selected level of porosity can be readily created.

BACKGROUND OF THE INVENTION

Metal oxide ceramic materials are a class of ceramic materials having a variety of industrial and scientific uses, the most common of which involve separation processes, catalysis, and adsorption. Such ceramic materials can be performed in planar layers, referred to as membranes because of their porosity, or may be sintered into dense monolithic vitrified or solidified glassine materials or blocks. Recently much research has been conducted on making these materials in a more porous form. For example, a method is disclosed in published PCT patent application WO89/00983, by the inventors here, of a method for the creation of polymeric and particulate metal oxide ceramic membranes. The method disclosed in that published patent application for creating particulate ceramic membranes involves the use of relatively large amounts of water in an alcoholic solution, in combination with a mild heating during peptizing, to create appropriate charged particles which can be dewatered and sintered to create a metal oxide porous ceramic membrane.

While membranes are one possible physical form that metal oxide ceramic materials may take, it is not the only one. One of the desirable attributes of many metal oxides formed of transition metals is that the transition metal can have catalytic properties desirable for certain photochemical or electrophotochemical reactions. These materials are also effective adsorbents. Metal oxide porous ceramic materials thus offer a potentially attractive candidate for use as catalytic or adsorbent agents in industrial scale chemical reactions. Metal oxide ceramic materials have great chemical stability, since they are resistant to organic solvents, to chlorine, and to some extremes of pH, to which organic catalytic agents may be susceptible. Ceramic materials are also inherently more stable at high temperatures, and therefore would allow for efficient sterilization of process equipment, another procedure not always possible with organic catalytic agents. Since metal oxide ceramic materials are also entirely inorganic, they are stable and resistant to microbial or biological degradation.

One of the limitations on the previous use of transition metals, and materials made from them, in catalytic or adsorbent processes is the need for the catalytic or adsorbent agents to be in a physical form which allows for a large degree of surface contact between the substrates of the reaction and the catalyst and/or adsorbent. Metal materials are often most readily available in the form of films, solid particles, or crystals, but none of these physical forms has a large degree of surface area which would be desirable for materials used as catalysts or adsorbents. While metallic materials can be coated onto relatively porous substrates, clearly it would be advantageous to have the substrate itself in a physical form which would be both stable and capable of convenient handling, and also which would have great surface area so as to make the catalytic or adsorbent agent available to the substrates for their reaction. One typical form of catalyst or adsorbent used in many industrial scale chemical reactions is a pellet. Such pellets can be loosely packed into beds or reactors. If the pellets are of a sufficient internal porosity, the vapor or liquid pressure drop through a reactor filled with such pellets will be within acceptable bounds. Since such pellets are often used in industrial catalytic or adsorbent processes, it is an advantage of any newly developed catalytic or adsorbent materials that they be capable of manufacture in a form which may readily be accepted by existing industrial applications.

The creation of metal oxide ceramic materials is generally conducted through what is referred to as a sol-gel procedure. In such a procedure, the metal alkoxide is initiated into solution in a solvent, in a reaction vessel in which the solvent is rapidly being stirred. Depending on the process, the solvent may be alcoholic or aqueous. Whichever solvent is used, the metal alkoxide in solution is then hydrolyzed to create metal hydroxide monomers, dimers, polymers and/or particles depending on the quantity of water used. The hydrolyzing metal oxide particles in the solution tend to aggregate and to readily precipitate from solution. The hydrolysis process must therefore be strictly limited by the control of one or more aspects of the process to prevent precipitation of insoluble metal oxide solids from the solution. The insoluble metal oxide particles are thus, in essence, maintained in suspension until they are peptized by the addition of an acid, which causes the particles of the metal oxide to have a greater propensity to remain in suspension, presumably due to opposing charges acquired by the particles during the peptizing process. Such stabilization of the formation of particles has also been accomplished sterically by adding surfactant agents. The stable suspension thus produced, referred to as a sol, is then treated by removal of the solvent therefrom to create a gel or semisolid material. Such gels may be subject to further removal of solvent, and are then sintered or fired to turn the gel from a semisolid into a completely solid, rigid, durable material. In the past such ceramic oxide materials had been formed typically as coatings, or as supported or unsupported membranes, or as monoliths or other solid densified and vitrified objects.

SUMMARY OF THE INVENTION

The present invention is summarized in that a process is described for creating metal oxide ceramic pellets in which the porosity of the material of the pellets is precisely controlled by means of adjusting the pH of the sol used to create the pellets by gradually removing protons from the metal oxide sol to a predefined threshold.

It is an object of the present invention to describe a method for creating a commercially acceptable and convenient form of metal oxide ceramic material for use in catalysis and other industrial applications which has a selectable porosity and thus a maximum surface area of metal oxide material available for catalytic contact with a substrate.

It is another object of the present invention to define a process of making metal oxide ceramic catalytic or adsorbent materials in which the porosity of the material can be selectively varied over a useful range by controlling the process of manufacturing the material.

It is another feature of the present invention in that it is described that certain metal oxide gel materials can be extruded prior to sintering so that they can be manufactured into commercially useful shapes for catalytic, adsorbent, and other industrial applications.

Other objects, advantages, and features of the present invention will become apparent from the following specification when taken in conjunction with the accompanying drawings.

DETAILED DESCRIPTION OF THE INVENTION

Figure 1:
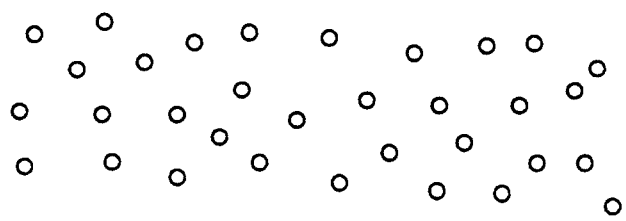
FIG. 1 is a schematic illustration intended to illustrate particles of metal oxide in a sol.
Figure 2:
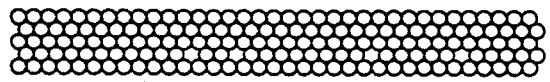
FIG. 2 is a schematic illustration of the particles of FIG. 1 condensed into a membrane.

The present invention is directed to a process of making metal oxide ceramic bodies having a selectable porosity. This overall process makes use of two novel processes. A first of the novel processes is directed toward the creation of controlled porosity ceramic materials in general. The second of the processes is directed toward the extrusion of viscous sols or hydro gels of metal oxide material into forms which can be sintered to make commercially useful forms of such material, such as pellets, for catalytic, and adsorbent industrial applications. When combined, these processes allow for the custom tailoring of metal oxide ceramic materials for useful catalysis and adsorbency applications in modern industrial uses.

The process of making porosity controlled ceramic materials is based on an adjustment of the manipulation of the pH of a sol created as a part of the process of preparing these special metal oxide ceramic materials. The theory behind this approach is that a particulate membrane is composed of a plurality of discrete metal oxide particles, which are packed during the gelation process, and which are fused in the sintering process to form a unitary material. Therefore the packing density of those particles, determines the porosity of the final membranes. If the particles are packed in a uniform, maximum density, closing packing arrangement, about 30% porosity will be achieved. In this case, the size of the particles will determine the size of the pores remaining between the particles in the resulting fused membranes. If, on the other hand, a looser packing of the particles can be obtained, then a material having a larger porosity will be achieved. It has been discovered that by controlling the degree of aggregation of particles in the sol stage, by adjusting the pH of the sol, the porosity of the resulting ceramic material can be selectively adjusted within a range. Through this technique, the porosity of the resulting material can be increased beyond that which could be obtained by a close packing of the particles in the resulting ceramic material.

It is also advantageous that the particles making up the membrane be small. If the particles in the sol grow larger, potential catalytic and adsorbent surfaces are buried in the interior of the aggregated particles and therefore not available to substrates. By contrast, if small particles are agglomerated into irregular clusters, to make larger clusters, instead of making the particles larger by accretion, maximum surface site availability is maintained. Thus a process for catalytic or adsorbent materials should favor particle to particle aggregation over particle size growth.

The theory behind the approach used to achieve this result can be understood by the fact that since most metal oxide particles have high charge in a sol when the sol is a low pH water medium, the particles remain in stable suspension only because of the electric charge repulsion which they have for each other. If the pH is gradually increased, by removing protons from the suspension created in this fashion, the particles will loose the electrical repulsion for each other and slowly aggregate into larger structures. The structure of these aggregates has been found to be more branched, or ramified, than similar aggregates which could be formed by adding electrolytes to the sol in order to achieve a similar effect through charge screening. The gradual removal of protons from the sol tends to form aggregations of particles, in contrast to an accretion process triggered by additional electrolytes which not only compresses the particles, but can lead to uncontrolled aggregation, flocculation, and ultimately precipitation of the particles from the solution.

FIGS. 1 through 5 generally illustrate this concept. FIG. 1 is intended to illustrate the general relationship of metal oxide particles formed in a sol. In FIG. 1, the particles in the sol are repelling each other due to charge, and are thus spaced randomly about in the solvent (not shown). If those particles are solidified using a close packing model, by removing the solvent, a continuous porous ceramic material, such as a porous ceramic membrane, will be created which has a microstructure much like that viewed in FIG. 2. The material will be reasonably porous, with the size of the pores determined solely by the size of the particles, since the only pores are those formed between the particles in the close packing model.

Figure 3:
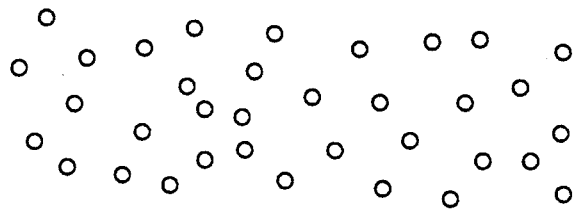
FIG. 3 is a schematic illustration intended to illustrate metal oxide particles in the process of the present invention.
Figure 4:
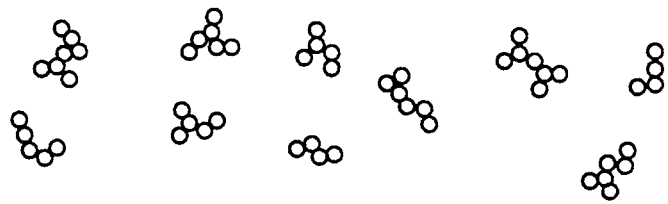
FIG. 4 is a schematic illustration illustrating the aggregation of particles in the metal oxide sol of FIG. 3.
Figure 5:
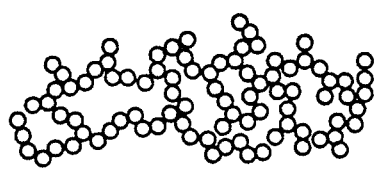
FIG. 5 is a schematic illustration of a membrane condensed from the particles of FIG. 4.

In FIGS. 3 to 5, the process of the present invention is schematically illustrated. In FIG. 3, again the metal oxide particles are indicated as they are formed in a sol. In FIG. 4, the first step of the porosity controlled process of the present invention is illustrated. In the sol at the stage of FIG. 4, the particles are aggregated by the slowly increasing pH into irregular ramified aggregates of particles. The aggregates of particles remain in solution or suspension in the sol, which can become significantly more viscous as a result. The sol containing these aggregates can then be dewatered, and sintered, into a material which resembles FIG. 5. This material as illustrated in FIG. 5 not only has small pores between the particles, but has, in addition, large vacuum or pore areas created between the aggregates of particles. Thus the density of the overall material is lower, and the porosity is higher, even though the particles themselves are the same. In this way, a high surface area, and a large porosity, are both combined in a unitary material formed as an aggregation of small particles.

One of the most useful features of ceramic oxide materials formed by the present process is their utility in catalytic and adsorbent processes. It is therefore an advantage to be able to fabricate these materials in a form suitable for use in existing industrial processes which rely on catalysts or adsorbents. Since one common form in which catalysts or adsorbents are generally sold and utilized in industrial processes is in pellets, the fabrication of metal oxide ceramic materials in pellet form is desirable. It has been found that certain sols, such as those described herein, are, in their semi-solid or viscous form, capable of extrusion. If the sols from the sol gel process are partially dewatered into a viscous but not yet completely gelified material, and the gelation is initiated but not completed, such partially solidified gels may be extruded through a suitable orifice to create elongated forms which may be cut, formed or otherwise reshaped into any desired size. Since the materials are semi-solid during the extrusion process, they retain the shape into which they are cut or formed if they are permitted to remain in that shape during the completion of the gelation process. In other words, gelation is started until the materials have a semi-solid form, then the extrusion or shaping process begins. Since these materials will generally retain their physical shape, other possible shaping or molding operations are also possible. Once the shaping process is completed, the gelation is allowed to continue to completion, to create shape retaining solid xerogel materials. Those solid gelled materials can then be sintered, or vitrified, by firing into ceramic materials which retain the shape of the shaped gels. By this process, continuous extrusions having any desired cross sections, such as circular ones, can be created. Through the cutting of the continuously extruded ribbon, sticks or pellets of any desired length can be created. Such pellets, when appropriately fired, retain their shape, are rigid and stable, and can be packed in any suitable reactor vessel or container as may be utilized in industrial applications.

While the method and product disclosed below are illustrated in particular with metal oxide ceramic membranes of titanium, zirconium, and a mixture of the two, it is has been described previously that the ceramic material fabrication methods proven to be effective with titanium may also be adapted for use with other transition metal oxide materials, as well as those of other elements such as silicon and aluminium. The method and product of the present invention has utility for these other metals as well. The method described below is exemplified with titanium and zirconium in particular because titanium is considered one of the more difficult metals to work with due to its strong tendency to rapidly hydrolyze and precipitate from solution. Titanium also has particularly unique and advantageous catalytic and photocatalytic properties which many other transition metals do not possess to the same degree.

In general, the process of the present invention begins with the creation of a metal alkoxide. Metal alkoxides are commercially available chemical supplies of reasonable cost. It has been found that such materials may be conveniently used in an aqueous or organic alcohol sol gel process to make metal oxide ceramics. This has been done conventionally by hydrolyzing the metal oxide, so that it precipitates, and then resuspending the metal oxide particles into the solution by peptizing the solution with nitric acid. Alternatively, it has here been found that in very acidic aqueous solution, the metal oxide precipitates are immediately redissolved. In any event, the product created by either of these processes is an acidic metal oxide solution, containing relatively small metal oxide particles in a highly acidic environment. Over time, if not otherwise treated, the metal oxide particles will tend to accrete in size, forming larger and larger particles. By screening the proton dependent charge on the particles through the addition of inert electrolytes such as $NaNO_3$, or KCl, one destabilizes the particles and causes aggregation or flocculation. It has been found, however, that increasing the pH in the suspension, by slowly removing protons from the solution, results in the aggregation of these particles into larger aggregates, such as illustrated in FIG. 4, without precipitation or flocculation. This can be done advantageously by dialyzing the acidic solution against pure de-ionized water to slowly remove protons from the solution. The pH of the solution needs to be monitored during dialysis, to control the porosity of the resulting product. Within limits, the higher the pH to which the sol is raised, the larger the porosity that the gel produced from the sol will exhibit. However, the zero point of charge (ZPC), or the pH value at which the metal oxide molecules carry no net charge, for the metal oxide is the limit to which the pH can be increased. Approaching the ZPC point will initiate the gelation of the solution within the dialysis process. As the solution slowly increases in pH, it will increase in viscosity slowly but gradually until the maximum point at which gelation occurs. Therefore, in practice of the present invention, if maximum porosity is desired, the solution shall be raised to a pH close to, but not quite at, the gelation point of the sol. As a pragmatic limit, 0.5 pH lower than the ZPC is the best condition for practical utility. For a titanium dioxide membrane, such a desirable pH is a pH of 4. For a zirconium dioxide membrane, the desirable pH is 6.4. For a mixture of 90% titanium and 10% zirconium, a suitable mixture is a pH of 4.5. Other metals will require slightly altered pH values depending on the ZPC for the material.

Once the dialysis has been conducted to the point at which the appropriate amount of protons are removed from the solution, and it is in a semi-solid or viscous state, the gel can be formed. This can be done by evaporating the remaining water from the sol in a desiccator box, in a roto-evaporator, or in some other fashion. Since the physical shape of the gel will be the same as the resulting metal oxide ceramic material, if membranes or planar layers are required, the gel should be plated or layered onto a support. Alternatively, if other shapes, such as those described below, are to be utilized the gel may be suitably manipulated as desired.

Once the gel has been appropriately dewatered, it may be fired to temperatures up to 400° C. to produce stable porosity controlled ceramic materials, the porosity of which will be dependent upon the pH to which the sol was raised during the process of proton removal.

It has been found that a particular advantage of this procedure is that during the gelation process, the semi-solid gel can be manipulated into any desired physical shape. The sols are preferably concentrated to a high degree of viscosity. This can be done by using a Rotarvapor. The viscous sol can be removed from the Rotarvapor, and then reshaped using any suitable reshaping device or process. It has been found, in particular, that the viscous sol, or semi-solid gel, can be extruded through a confined orifice under pressure. This has been done utilizing a simple plastic syringe with a diameter of about 8 millimeters. The solidified, semi-solid gel can be loaded into the syringe, and then manually ejected from the syringe mouth, resulting in a tube or ribbon of soft solidified gelled material having a diameter of the orifice, i.e., about 8 millimeters, and which can be cut into any desired length. The shaped, solidified, soft gel can then be desiccated and fired to result in ceramic bodies that are crack free, stable in shape and size, and have a high degree of porosity. The resulting ceramic bodies will have shrunk, during the desiccation process, to a size approximately one half of that in each dimension of the solidified soft gel material from which they were sintered.

Using the porosity control process for making metal oxide ceramic materials, it has been found that the porosity of the material can be increased from 25 to 50% when the pH of the sol increases from 1.5 to 4.0 by dialysis using titanium dioxide. For similar xerogel using zirconium dioxide, the porosity has been found to increase from 15%, at a pH under 4, to about 40% at a pH of 6.6. The mean pore diameter of the titanium dioxide xerogels produced by the procedure is generally within the range of single digit nanometers. It is to be understood that the mean pore diameter is, however, an aggregate of both the small pores contained between the individual particles, and the larger pores created between the aggregates of the particles. The sintering process will reduce the porosity slightly. However, it has been found that larger porosity in the xerogel stage still results in larger porosity in the ceramic resultant product that similar xerogels having a lower porosity at an analogous stage in the process.

Utilizing the extrusion and cutting technique to make porosity controlled ceramic pellets, it has been found that porosity within the range of 30 to 50% is readily achievable from these sols. The shaped ceramic bodies have high surface area, in the range of 50-400 square meters per gram of material. The resulting ceramic pellets are translucent and crack free. The translucency is believed to be a result of small particles forming up the materials, which are so small as to be incapable of refracting or interacting with light in a visible wave length.

Examples

Example 1

Titanium Oxide Membrane

A titanium dioxide porosity controlled membrane was created using a peptized sol approach. To begin with, 200 milliliters of distilled dionized water was mixed with 1.4 milliliters of concentrated ACS certified $HNO_3$. Then 33 milliliters of titanium tetra-isopropoxide ($Ti(OPr^i)_4$) was added drop by drop into the acidic water while stirring. Precipitation of particles occurred immediately after addition of the metal alkoxide. The precipitant was then stirred continuously for three days until peptized and thus resuspended in solution to make the metal oxide sol. 150 milliliters of the peptized sol was then dialyzed in 4 liters of Milli-Q water for 4 hours. The resulting 30 milliliters of dialyzed sol was then further dialyzed in another 4 liters of Milli-Q water, for an additional 5 hours, until the resulting gelled material had a final pH of 3.5. The dynamic viscosity of the gel thus produced was measured by viscometer to be 5.6 cP. The viscous sol thus produced was put into a plastic dish and placed in a desiccator box for slow evaporation of the remaining solvent. One week was allowed for drying, after which the resulting xerogel was measured by nitrogen adsorption. The results indicated that the gel thus produced had a porosity of 54%, and a surface area of approximately 375 square meters per gram. The resulting xerogel was then fired to make a membrane by sintering at 400° C. for ½ hour. The transparent titanium dioxide membrane thus produced was measured again, by nitrogen adsorption, and found to have a porosity of 48% and a specific surface area of 180 square meters per gram.

Example 2

Zirconium Oxide Membrane

The above Example 1 was replicated using a titanium material to make a titanium dioxide membrane. In this instance, 150 milliliters of distilled dionized water was mixed with 3 milliliters of concentrated $HNO_3$. To that mixture, 11 milliliters of zirconium tetra-propoxide ($Zr(OPr^n)_4$) in 70% solution was added into the acidic water while stirring. Again precipitation immediately occurred. The precipitant was then stirred continuously for 1 day until peptized into a sol. Then 150 milliliters of the sol was dialyzed in 4 liters of Milli-Q water for 2 days, during which time the water against which the dialysis was conducted was changed 4 times. Then 30 milliliters of the dialyzed sol was put in 4 liters of water, and then underwent further dialysis for 2 more days against purified water while changing the Milli-Q water 4 times during the dialysis process. The final pH from the dialysis process was 6.7. The sol was viscous, and was allowed to evaporate solvent in a desiccator box to produce a clear xerogel. Nitrogen adsorption measurements of the xerogel indicated a 40% porosity and a specific surface area of approximately 175 square meters per gram. The membrane fired at 400° C. for 1 hour was rigid, stable, and transparent. The resulting membrane was found to have a porosity of 39% and a specific surface area of 99 square meters per gram.

Example 3

Titanium Membrane

In this replicate, the small particles of metal oxide were created using the strong acid solution method described briefly above. In this instance, 88 milliliters of distilled dionized water were mixed with 20 milliliters of concentrated $HNO_3$. Then 8.9 milliliters of titanium tetra-isopropoxide ($Ti(OPr^i)_4$) was slowly dripped into the extremely acidic solution, while it was violently stirred. The precipitate formed by hydrolysis was immediately dissolved, resulting immediately in a clear ionic solution. The clear ionic solution was then poured directly into a dialyzing membrane, which was subsequently put into 4 liters of Milli-Q water for dialysis. The dialysis continued over 1½ days, while changing the water 4 times, until a transparent sol having a pH of 3.34 was obtained. This sol contained about 14.5 grams per liter of titanium dioxide. The sol was then placed in a desiccator box for evaporation of the solvent, which resulted in a clear gel. The clear gel was further dried and fired at a temperature of approximately 400° C. Nitrogen adsorption measurements indicated that the xerogel had a porosity of 49%, and a specific surface area 420 square meters per gram. The xerogel had a mean pore diameter of 1.4 nanometers. The transparent ceramic titanium membrane produced after firing at 300° for 1 hour was measured, and found to have a 42% porosity and a specific surface area of 237 square meters per gram.

Example 4

Titanium Dioxide Pellets

A control porosity titanium dioxide sol was created through the process of Example 1 above. The sol was dialyzed until it had a pH of 2.5. The sol was then concentrated in a Rotarvapor at 35° C. until the sol became viscous. The very viscous sol was then removed from the Rotarvapor flask and placed into a plastic syringe mold, in which it was allowed to stand for ½ hour. At the end of that time, the sol in the mold had gelified and solidified. The syringe mold had an orifice of about 8 millimeters. The soft solidified gel was extruded through the syringe mouth in a continuous ribbon. The ribbon was cut into segments approximately every 20 millimeters. The shaped gel sticks thus created were placed on a flat surface, and allowed to dry in a desiccator box at room temperature for about 1 week. The xerogel sticks thus created were fired at a temperature of 400° C. for 1 hour. The pellets thus created were transparent and could easily be perceived to be porous due to their relatively light weight and low density. The fired pellets experienced about a 50% shrinkage in size from the xerogel sticks, thus having a final size of a diameter of about 4 millimeters and a length of about 10 millimeters. The pellets were generally crack free. The sintered pellets prepared in this fashion were determined to have a mean porosity of 39%.

Example 5

A titanium dioxide pellet was created through a process similar to Example 4 above, except the sol was dialyzed until the pH had reached 2.9. The resulting titanium dioxide pellet had a measured porosity of 43%. Again this indicates that increasing pH during the sol stage can result in higher porosity in the ceramic material thus produced.

This indicates that, if properly handled, metal oxide sols can be concentrated to a certain stage, and then extruded into any desired shape for forming suitable products for use in catalysis absorbance or other applications. A Rotarvapor is a desirable device for conducting the concentration of a sol for such a purpose since the rotation can keep the sol moving during evaporation and thereby avoid unnecessary gelation. This procedure keeps the viscosity within limits so that it can be shaped. The porosity of the final product is only related to the pH of the precursor sol, and that pH can be adjusted depending upon the amount of dialysis to which the sol is exposed. Concentrating the sol and extruding the gel through the extrusion process does not seem to effect the porosity of the final product. Any shape or size of ceramic body can thus be prepared using this method, while obtaining a very highly porous ceramic material having a high degree of accessibility to potential catalytic or absorbing substrates.

We claim:

1. A method of making a metal oxide porous ceramic body comprising the steps of
hydrolyzing a metal alkoxide in an aqueous solution having a pH of less than 2 to create a metal oxide aqueous sol;
dialyzing the hydrolyzed metal oxide aqueous sol against purified water while monitoring the rising pH of the sol to create a viscous sol;
shaping the viscous sol into a physical shape;
drying the viscious sol into a xerogel;
firing the xerogel at a temperature of up to 500° C. to make a solid porous metal oxide body in the physical shape and having a porosity determined by the pH to which the sol was dialyzed.

2. A method of making a metal oxide porous ceramic body as claimed in claim 1 wherein the hydrolyzing step includes the steps of mixing acidic water with metal alkoxide so that a precipitate is formed and then stirring the precipitate and water until the precipitate is peptized into solution.

3. A method of making a metal oxide porous ceramic body as claimed in claim 1 wherein the hydrolyzing step includes the step of mixing metal alkoxide with an aqueous acidic solution having a pH of less than the zero point of charge for the metal oxide such that metal oxide precipitates which then form are promptly dissolved in the metal oxide aqueous sol.

4. A method of making a metal oxide porous ceramic body as claimed in claim 1 wherein the dialysis step the sol is dialyzed until it has a pH of about 0.5 less than the zero point of charge for the metal oxide.

5. A method of making a metal oxide porous ceramic body as claimed in claim 4 wherein the metal oxide is titanium dioxide and the zero point of charge is at about pH 4.5.

6. A method of making a metal oxide porous ceramic body as claimed in claim 1 wherein the shaping step includes placing the sol on a support to make a membrane.

7. A method of making a metal oxide porous ceramic body as claimed in claim 1 wherein the shaping step includes extruding the sol into a continuous ribbon and cutting the ribbon into pellets.

8. A method of making a metal oxide porous ceramic body as claimed in claim 1 further including the step of concentrating the sol after the pH has been reached to increase its viscosity.

9. A method of making a metal oxide porous ceramic body comprising the steps of
hydrolyzing a metal alkoxide in an aqueous solution having a pH of less than 2;
removing protons from the hydrolyzed aqueous solution while monitoring the rising pH of the sol to create a viscous sol;
shaping the viscous sol into a physical shape;
drying the viscous sol into a xerogel;
firing the xerogel at a temperature of up to 500° C. to make a solid porous metal oxide body in the physical shape and having a porosity determined by the pH reached during the step of removing protons.

10. A method of making a metal oxide porous ceramic body as claimed in claim 9 wherein the hydrolyzing step includes the steps of mixing water with acidic metal alkoxide so that a precipitate is formed and then stirring the precipitate and water until the precipitate is peptized into solution.

11. A method of making a metal oxide porous ceramic body as claimed in claim 9 wherein the hydrolyzing step includes the step of mixing metal alkoxide with an aqueous acidic solution having the pH of less than that pH necessary to achieve solubility of the metal oxide such that any metal oxide precipitates created are promptly dissolved in the solution.

12. A method of making a metal oxide porous ceramic body as claimed in claim 9 wherein in the step of removing the protons continues until the sol has a pH of about 0.5 less than the zero point of charge for the metal oxide.

13. A method of making a metal oxide porous ceramic body as claimed in claim 9 wherein the metal oxide is zirconium dioxide and the zero point of charge is at about pH 6.4.

14. A method of making a metal oxide porous ceramic body as claimed in claim 9 wherein the shaping step includes placing the sol on a support to make a membrane.

15. A method of making a metal oxide porous ceramic body as claimed in claim 9 wherein the shaping step includes extruding the sol into a continuous ribbon and cutting the ribbon into pellets.

16. A method of making a metal oxide porous ceramic body as claimed in claim 9 further including the step of concentrating the sol after the pH has been reached to increase its viscosity.

17. A method of making metal oxide ceramic pellets comprising the steps of hydrolyzing a metal oxide solution to produce a metal oxide sol;

concentrating the metal oxide in the sol to raise its viscosity until a viscous sol is created which is capable of holding its physical shape;

extruding the viscous sol through an orifice to make a ribbon of viscous metal oxide sol;

cutting the ribbon into pellets of viscous metal oxide sol;

drying the pellets into a xerogel by removing the remaining solvent therefrom; and sintering the xerogel pellets up to a temperature of about 500° C. to produce metal oxide porous pellets.

18. A method as claimed in claim 17 wherein the hydrolyzing step includes the steps of introducing a quantity of metal alkoxide into an aqueous solution so that it precipitates and then peptizing the solution containing the precipitate with acid to suspend the precipitate.

19. A method as claimed in claim 17 wherein the hydrolyzing step includes the step of introducing a quantity of metal alkoxide into an aqueous solution with a pH of less than that pH necessary to achieve solubility of the metal oxide such that any metal oxide precipitates created are promptly dissolved in the solution.

20. A method as claimed in claim 17 wherein the concentrating step includes removing protons from the sol by dialysis.

21. A method as claimed in claim 17 wherein the concentrating step includes concentrating the sol in a Rotarvapor.

22. A novel composition of matter comprising a metal oxide porous ceramic pellet formed of an oxide of a transition metal, which is transparent, and which is formed in the shape of a segment cut from a continuous extruded ribbon, the pellet having a porosity in excess of 30% and a mean surface area available for contact with a substrate in excess of 50 square meters per gram.

23. A novel composition of matter comprising a titanium dioxide porous ceramic pellet which is transparent, and which is formed in the shape of a segment cut from an extruded ribbon, the pellet having a porosity in excess of 30% and a mean surface area available for contact with a substrate in excess of 50 square meters per gram.

24. A metal oxide ceramic pellet produced by the process of claim 19.

* * * * *

UNITED STATES PATENT AND TRADEMARK OFFICE
CERTIFICATE OF CORRECTION

PATENT NO. : 5,227,342
DATED : July 13, 1993
INVENTOR(S) : Marc A. Anderson and Qunyin Xu It is certified that error appears in the above-identified patent and that said Letters Patent is hereby corrected as shown below:

On the title page, item (75) Inventors: Second inventor should--Qunyin Xu--.

In the specification, column 1, after the title, insert on line 4:
   --Statement Regarding Federally Sponsored Research This invention was made with United States Government support awarded by the Department of Energy (DOE), Grant No. DE-AS07-86ER12626. The United States Government has certain rights in this invention.--

Signed and Sealed this

Fifteenth Day of March, 1994

*Attest:*

BRUCE LEHMAN

*Attesting Officer*   *Commissioner of Patents and Trademarks*